March 31, 1925.
T. BOVEY
VALVE FOR AUTOMOBILE HEATERS
Filed April 5, 1923
1,531,729
2 Sheets-Sheet 1
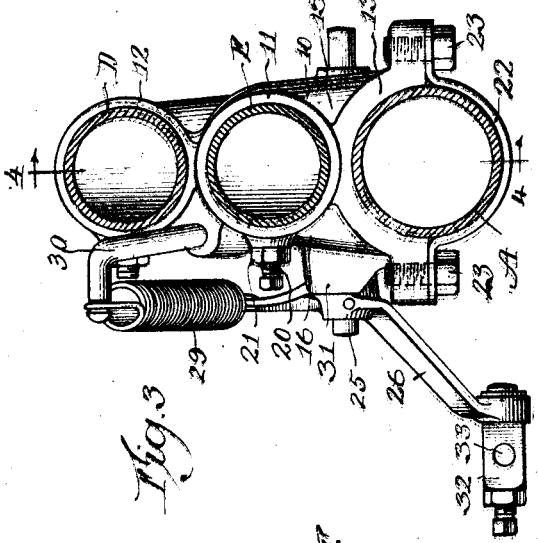
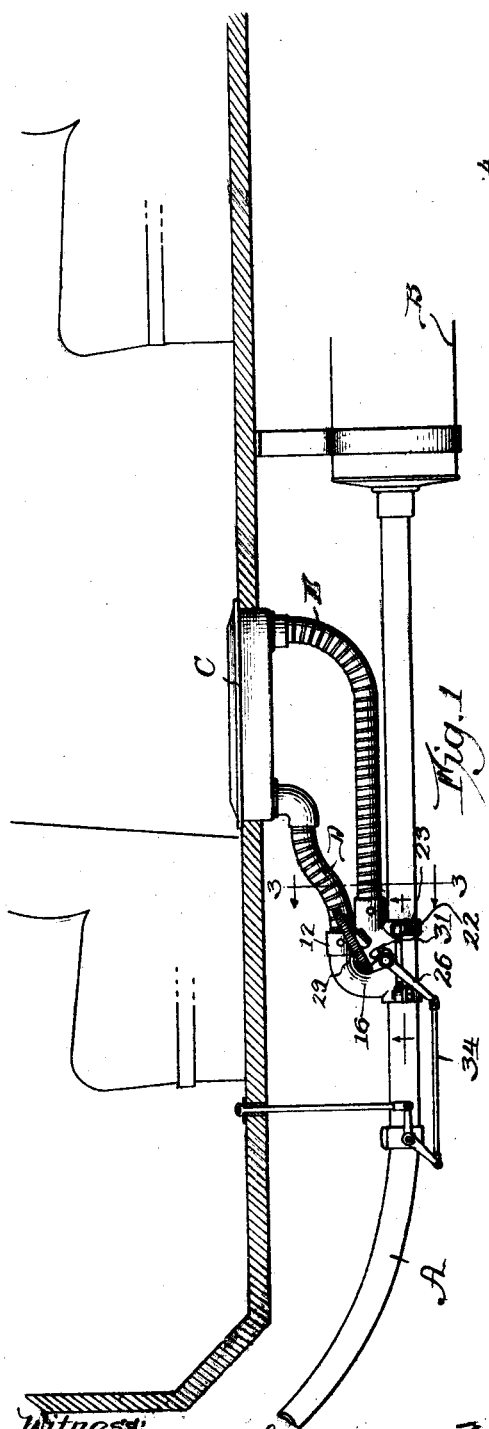
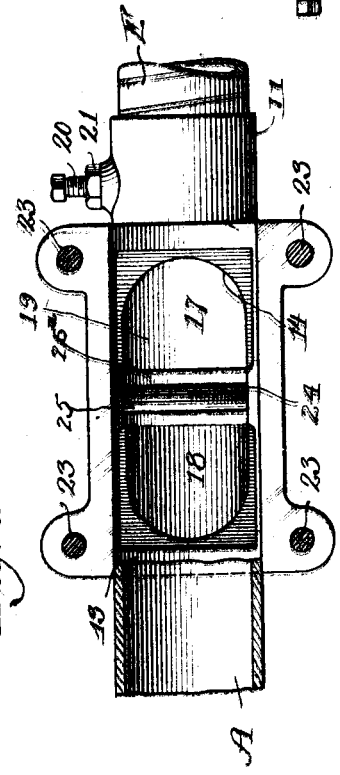
Inventor,
Thomas Bovey
By Frank D. Thomason, Atty.
Witness:
Chas. R. Koursh

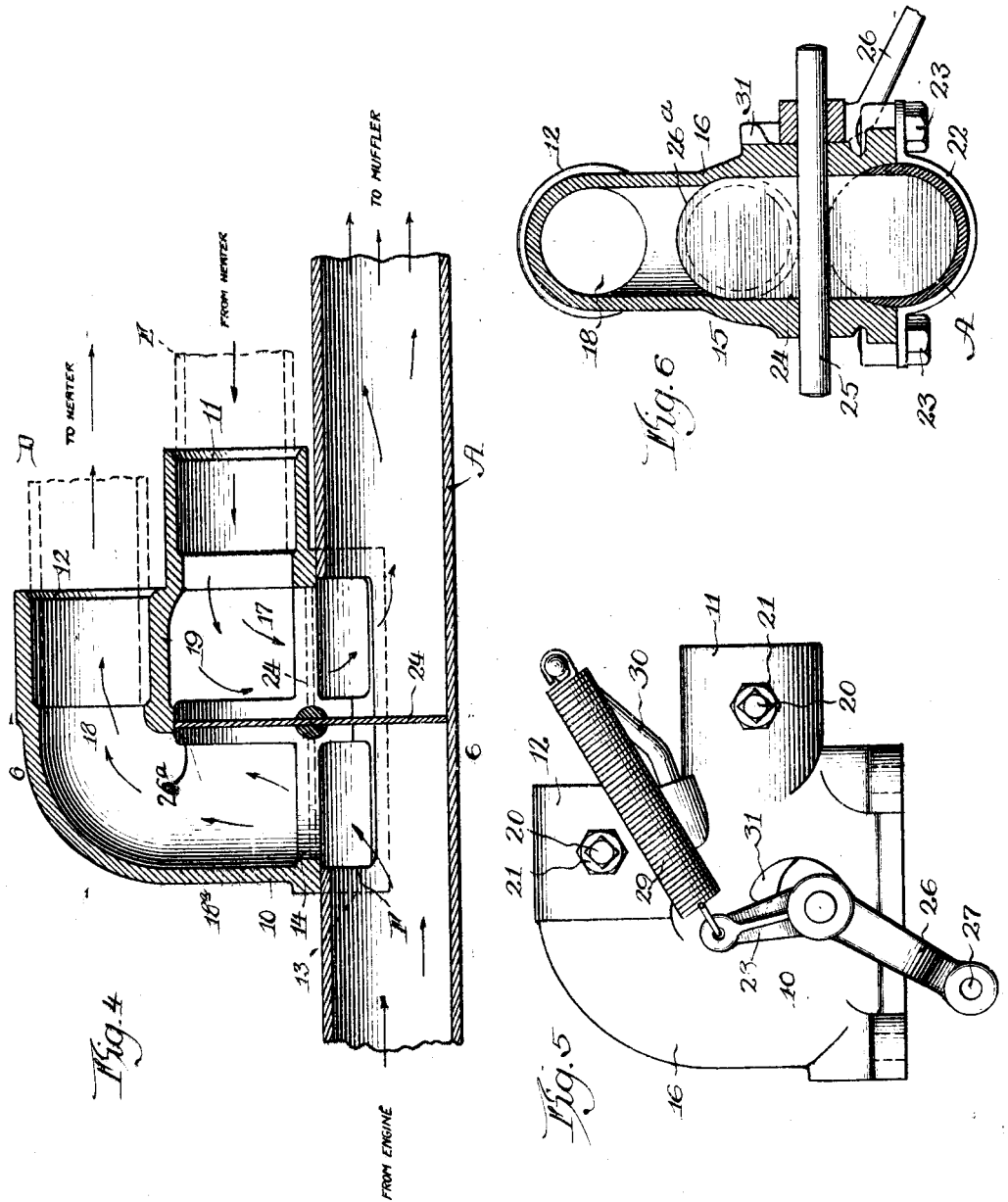

Patented Mar. 31, 1925.

1,531,729

UNITED STATES PATENT OFFICE.

THOMAS BOVEY, OF CHICAGO, ILLINOIS.

VALVE FOR AUTOMOBILE HEATERS.

Application filed April 5, 1923. Serial No. 629,987.

*To all whom it may concern:*

Be it known that I, THOMAS BOVEY, a citizen of the United States, residing at Chicago, in the county of Cook and State of Illinois, have invented a new and useful Improvement in a Valve for Automobile Heaters, of which the following is a specification.

My present invention relates to means in the form of a valve for diverting the hot exhaust gas flowing from the internal combustion engine of an automobile, and supplying said hot gas to a heater or radiator inside the vehicle.

Among the objects of my invention are to provide a valve which when entirely opened to feed the heater will divert practically all of the exhaust gas from the engine and when closed will present no obstruction to the free passage of the gas to the muffler. The construction of the valve is such that when closed it will prevent leakage of the hot gas to the heater by equalizing the pressure upon opposite sides of the pintle or axis of the valve plate, and when opened will divide the interior of the valve casing in such manner that the hot gas will be taken out of the exhaust pipe and returned thereto through the same casing. Also I am able by the construction of my valve to silence the exhaust because it takes the gas from the discharge pipe and returns it to said pipe so that said gas is in continuous motion and is discharged in the usual manner through the muffler at the end of said exhaust pipe. This overcomes the objectionable hissing sounds that are prevalent in most of the heater devices now in general use; and it also avoids the necessity of providing a separate exhaust pipe and additional muffler device for the heater which entails an additional expense. Other objects reside in providing a valve for an automobile heater that is simple in construction and dependable in operation; that may be economically manufactured, and which may be readily connected to the heater and the exhaust pipes.

All of the foregoing objects I prefer to carry out in the manner hereinafter fully described and as particularly pointed out in the claims, reference being made to the accompanying drawings that form a part of this specification.

In the drawings:—

Figure 1 is a longitudinal side elevation of a fragmentary portion of an automobile showing my valve installed upon the exhaust pipe of the engine and showing the connection of the same with the heater in the floor of a motor vehicle.

Figure 2 is a bottom plan of the valve detached from the exhaust pipe and drawn to a larger scale.

Figure 3 is a vertical end view of the valve with the pipes in section on lines 3—3, Figure 1.

Figure 4 is a vertical longitudinal section of the valve taken on line 4—4, Figure 3.

Figure 5 is a longitudinal side elevation of the valve detached from the pipes.

Figure 6 is a transverse vertical section taken on line 6—6, Figure 4.

In the drawings similar reference characters are used to designate like parts wherever they occur throughout the several views. Referring to Fig. 1, A designates the exhaust pipe leading from the motor to the muffler B below floor of the vehicle body, and C is a typical heater that is set into the floor in the usual manner and is connected to the valve casing by conduits D and E that respectively convey the hot gas to the heater and return said gas to the valve casing and the exhaust pipe on which the valve casing is mounted at a point intermediate the engine and the muffler. It may be here stated that in connecting my valve to the exhaust pipe A the latter need not be severed or removed, but merely a short semi-cylindrical piece is removed to provide an elongated opening F in the upper segment of the pipe at the point where it is desired to position the valve.

My valve preferably consists of a casting that forms the casing 10 or housing of the valve with pipe stubs 11 and 12 extending therefrom and its lower portion is preferably a half-cylinder to provide a saddle or seat 13 of concave section that straddles the exhaust pipe at the location of the opening therein. In the crown or upper portion of the saddle or seat is an elongated opening 14 that registers with opening F in the exhaust pipe and the opposite side walls 15 and 16 of the casing extend upwardly substantially parallel with each other. Suitable passageways 17 and 18 connecting respectively with studs 11 and 12 are provided by a partition or web 19, and as seen the passageways together with their respective stubs have their axes parallel with each other and disposed one above the other, and it will also be noted that these elements are similarly arranged with respect to the exhaust pipe and the saddle of the casing which are below the same. The pipes E and D are of the flexible conduit type and their adjacent ends are inserted in the outer ends of the respective stubs 11 and 12 and secured therein by means of transverse bolts 20 screwed through threaded apertures in the stubs to engage said pipes, which bolts are locked in position by lock-nuts 21. After the casing has been placed upon the exhaust pipe A and properly positioned with respect to the elongated opening F therein the structure is securely clamped in position by means of suitable straps or yokes 22 that engage the under segment of the pipe A opposite the casing and have their laterally bent ends engaged by bolts or screws 23 that co-act with threaded ears extending laterally from the lower portion of the casing.

The valve is preferably of the butterfly type and consists of an elongated plate 24 having rounded ends (Figure 6) which is mounted intermediate its ends upon a horizontally disposed spindle 25 having bearings in opposite walls of the casing and extending transversely across the elongated opening 14 in the lower portion of the casing. This opening as seen in Figure 3 of the drawings corresponds in shape and size with the valve plate 24 so that when the valve is closed by moving it to the horizontal position shown in Figure 4 it will completely close the opening and permit no gases from the exhaust pipe A to enter the casing and thereby be admitted to the heater. The curvature and shape of the edges of the valve plate 24 likewise correspond with the interior of exhaust pipe A while the walls of the casing immediately above the spindle 25 are shaped and arched as at 26ª to conform with the co-acting edge of the valve plate, so that when the valve is opened and the plate is in the vertical position shown in Figures 4 and 6 said valve plate will form a closure or partition transversely of the exhaust pipe A and vertically of the casing below the inner end of the web 19. A lateral extension 18ª of the passageway 18 extends down from the latter to the opening 14 in the casing and establishes communication between the pipe or conduit D and the exhaust pipe A when the valve is opened to discharge the hot exhaust gas to the heater C, and at the same time the portion of the valve plate 24 which in this position above the spindle 25 will seat against the interior of side walls 10 and the arched portion 26ª thereby closing communication between the inner portion of passageway 17 and the lower portion of lateral passageway 18ª. When the valve plate is vertically disposed the hot gas from the exhaust pipe A is all diverted by the lower half of the plate 24 from the exhaust pipe A upwardly into the lateral passageway 18ª, through the passageway 18 and into the pipe D leading to the heater, from which latter the gas after circulating returns through pipe E to the passageway 17 from which it is discharged back into the exhaust pipe A from the casing upon the opposite of the valve plate 24, all as indicated by the arrows in Figure 4 of the drawings.

Upon one of the extended ends of the spindle 25 is secured a bell-crank operating lever 26 the longer arm of which extends obliquely downwardly and is deflected slightly outwardly as seen in Figure 3 of the drawing and its lower end is provided with an aperture or eye 27. The opposite or shorter arm 28 extends upwardly from the boss or hub of the bell-crank and is connected at its outer end to the adjacent end of a coiled contraction spring 29, which latter extends between said bell-crank arm and a post to which its opposite end is connected. The tendency of the spring is to maintain the valve-plate 24 normally in a horizontal position so that the heater is shut off, and a stop-lug 31 is formed on the casing adjacent the bearing of the valve spindle and, against which the bell crank arm 28 impinges when drawn to the limit of its movement by the spring 29. A swivel block 32 is pivotally mounted in the aperture or eye 27 of the bell-crank arm 26 that is provided with a transverse bore 33 to receive one end of an operating rod 34 that is suitably connected through the floor of the vehicle within ready reach of the driver or passenger so that the valve may be operated to turn the hot exhaust gas into the heater or shut it off as desired.

What I claim is:—

1. A valve comprising a casing having two ports disposed side by side, a partition extended into said casing and dividing the interior into two passageways communicating respectively with said ports and providing a chamber within said casing at the inner ends of said passageways, a concave seat formed upon the lower portion of said casing and adapted to receive an apertured portion of a pipe, and an oscillatory plate mounted in the plane of the top of said seat arranged to close the aperture in said pipe, said plate being movable to a transverse plane whereby one edge engages said partition and divides said chamber.

2. A valve comprising a casing having two ports disposed side by side, a partition extended into said casing and dividing the interior into two passageways communicating respectively with said ports and providing a chamber within said casing at the inner ends of said passageways, a concave seat formed upon the lower portion of said casing and provided with an opening, a valve plate pivoted intermediate its ends in said aperture whereby said plate is movable to a position to close said opening and to a lateral position to divide said chamber.

3. A valve comprising a casing having a plurality of passageways therethrough, a plurality of stubs communicating with the respective passageways, a transversely pivoted plate at the ends of said passageways opposite said studs and movable to open and close the same, and rotatable means upon which said plate is mounted whereby said plate is movable to a position to close the inner ends of said passageways and to a transverse position to provide continuations of said passageways within said casing.

4. A valve comprising a casing, a discharge stub therefor, a return stub adjacent said discharge stub, a web within said casing providing passageways leading to said stubs and a pivoted flat valve plate controlling the ends of said passageways opposite said stubs, said plate adapted to be seated against said web to permit a flow through said passageways and movable to a position across the end of both passageways to close the same.

5. The combination with a feed pipe having an elongated opening therein, of a valve casing engaging the pipe and surrounding said opening and having an aperture in registry therewith, said casing having a discharge and a return passageway both communicating with said opening, and a valve plate pivotally mounted in the aperture in said casing and movable into one position to close said casing aperture and said passage-ways and movable into another position to extend transversely across said pipe whereby the fluid moving in said pipe is taken from it and returned to it through the casing.

6. In combination with a pipe having an aperture therein, a casing having an aperture coinciding with the aperture in said pipe, a valve plate closing the aperture in said casing, a spindle mounted transversely across said aperture upon which said plate is secured, and stubs leading from said casing and opening into said pipe on opposite sides of the pivot of said plate.

7. In combination with a pipe having an aperture therein, a casing having an aperture coinciding with the aperture of said pipe, an arched seat within said casing above said aperture, stubs leading from said casing and opening into said pipe, a single valve plate operable in the aperture in said casing, said valve movable into one position to close said aperture and into another position to provide a plurality of passageways within said casing.

In witness whereby, I set my hand this 3rd day of April, 1923.

THOMAS BOVEY.